US012658740B2

(12) United States Patent
Bayat

(10) Patent No.: US 12,658,740 B2
(45) Date of Patent: Jun. 16, 2026

(54) WIRELESS CHARGER AND METHOD OF CHARGING AN ELECTRONIC DEVICE

(71) Applicant: NOA THE BRAND PTY LTD, Sydney (AU)

(72) Inventor: Arvin Bayat, Sydney (AU)

(73) Assignee: NOA THE BRAND PTY LTD, New South Wales (AU)

( * ) Notice: Subject to any disclaimer, the term of this patent is extended or adjusted under 35 U.S.C. 154(b) by 817 days.

(21) Appl. No.: 17/910,905

(22) PCT Filed: Mar. 10, 2021

(86) PCT No.: PCT/AU2021/050207
§ 371 (c)(1),
(2) Date: Sep. 12, 2022

(87) PCT Pub. No.: WO2021/179039
PCT Pub. Date: Sep. 16, 2021

(65) Prior Publication Data
US 2023/0031837 A1      Feb. 2, 2023

(30) Foreign Application Priority Data

Mar. 13, 2020    (AU) ................................ 2020900762

(51) Int. Cl.
*H02J 50/90*        (2016.01)
*H02J 50/10*        (2016.01)

(52) U.S. Cl.
CPC .............. *H02J 50/90* (2016.02); *H02J 50/10* (2016.02)

(58) Field of Classification Search
CPC ...................................................... H02J 50/90
USPC ......................................................... 320/108
See application file for complete search history.

(56) References Cited

U.S. PATENT DOCUMENTS

| | | | |
|---|---|---|---|
| 2009/0033280 A1 | 2/2009 | Choi et al. | |
| 2010/0259217 A1* | 10/2010 | Baarman ................. | H02J 50/80 |
| | | | 320/108 |
| 2014/0091633 A1 | 4/2014 | Walley et al. | |
| 2017/0194809 A1* | 7/2017 | Partovi ................... | H02J 50/70 |

(Continued)

OTHER PUBLICATIONS

Extended European Search Report for European Application No. 21767796.2 mailed Apr. 4, 2024.

(Continued)

*Primary Examiner* — Edward Tso
*Assistant Examiner* — Ahmed H Omar
(74) *Attorney, Agent, or Firm* — Carlson, Gaskey & Olds, P.C.

(57)        ABSTRACT

A method for charging an electronic device and a wireless charger having a set of transmitter coils and a plurality of magnetic field sensors are disclosed. The method may comprise measuring magnetic fields in a predetermined charging region, detecting a change in the magnetic fields, and selecting the subset of the transmitter coils associated with the one of the magnetic field sensors. The method may further comprise energising each transmitter coil in the subset of the transmitter coils to transmit a predetermined maximum power output, selecting one transmitter coil from the subset of the transmitter coils, determining a first power output of said one transmitter coil, and energising said one transmitter coil to transmit at the first power output.

17 Claims, 10 Drawing Sheets

(56)          References Cited

U.S. PATENT DOCUMENTS

2018/0152051  A1*   5/2018   Kim ..................... H02M 3/155
2019/0312452  A1    10/2019   Chen

OTHER PUBLICATIONS

International Search Report for International Application No. PCT/
AU2021/050207 mailed May 7, 2021.

\* cited by examiner

10

100

128

126

118

116    Q1    Q2

10

122    102    100

118

WIRELESS CHARGER AND METHOD OF CHARGING AN ELECTRONIC DEVICE

TECHNICAL FIELD

The present disclosure relates to a wireless charger and a method of charging an electronic device.

BACKGROUND

Wireless chargers have been developed to allow battery-powered electronic devices, such as mobile phones and more recently earphones, wearable health monitor devices and smart watches, to be charged without the need for a physical charging connection. Typically, wireless chargers employ a charging coil or 'transmitter' coil disposed below a charging surface to produce a magnetic field from which electrical power in the form of an electric current is induced in a corresponding receiver coil in the electronic device. The induced current is used to charge the battery of the electronic device.

Conventional wireless chargers typically draw power from an external power source, such as an alternating current (AC) power supply, to energise the transmitter coil to produce the magnetic field. Such wireless charging devices therefore require physical connection to the external power source, which places limitations on the use and portability of the wireless charging device.

Further, conventional wireless chargers typically require electronic devices to be placed at a specific location and orientation on a relatively small charging surface in order for the receiver coil in the electronic device to be sufficiently aligned, and thus electromagnetically coupled, with the corresponding transmitter coil in the wireless charging system to receive power therefrom. If the receiver coil and the transmitter coil are misaligned, then the electronic device may not be able to receive much power from the transmitter coils and the efficiency of power transfer may therefore decrease.

In an attempt to allow an electronic device to be placed freely on the charging surface of the wireless chargers, some wireless chargers have been developed to include multiple transmitter coils below the charging surface so that at least one of the transmitter coils will have sufficient coupling with the receiver coil of the electronic device. However, effective power transfer may still not be achieved if the receiver coil and the corresponding transmitter coil are misaligned. Further, in such arrangements, all of the transmitter coils are typically energised simultaneously, which can result in excessive heat generation as well as inconsistent charging caused by interference in the overlapping magnetic fields of each transmitter coil. Moreover, each of the transmitter coils are typically energised to only transmit at a single power output regardless of the battery level of the electronic device at any given time. This can also lead to inefficient power transmission between the wireless charger and the electronic device.

Object

It is an object of the present disclosure to substantially overcome or ameliorate one or more of the above disadvantages, or at least provide a useful alternative.

SUMMARY

In accordance with an aspect of the present disclosure, there is provided a method for charging an electronic device having a receiver coil by a wireless charger having a set of transmitter coils and a plurality of magnetic field sensors, each of the magnetic field sensors associated with a subset of the transmitter coils, the method comprising:

measuring, with the magnetic field sensors, magnetic fields in a predetermined charging region;

detecting a change in the magnetic fields based on measurements by one of the magnetic field sensors indicative of the electronic device in the predetermined charging region;

selecting the subset of the transmitter coils associated with said one of the magnetic field sensors;

energising each transmitter coil in the subset of the transmitter coils to transmit a predetermined maximum power output for the receiver coil;

selecting one transmitter coil from the subset of the transmitter coils based on measurements by said one of the magnetic field sensors;

determining a first power output of said one transmitter coil based on measurements by said one of the magnetic field sensors; and energising said one transmitter coil to transmit at the first power output for the receiver coil.

Selecting one transmitter coil from the subset of the transmitter coils may comprise:

calculating mutual inductances between each transmitter coil in the subset of the transmitter coils and the receiver coil based on measurements by said one of the magnetic field sensors; and comparing the mutual inductances with a predetermined inductance range to select said one transmitter coil from the subset of the transmitter coils.

The predetermined inductance range may be between 125 and 860 microhenries.

Determining a first power output of said one transmitter coil may comprise:

selecting the first power output from a first predetermined set of power outputs associated with the mutual inductance between said one transmitter coil and the receiver coil.

Selecting one transmitter coil from the subset of the transmitter coils may comprise:

calculating misalignment correction values between each transmitter coil in the subset of the transmitter coils and the receiver coil based on measurements by said one of the magnetic field sensors;

calculating mutual inductances between each transmitter coil in the subset of the transmitter coils and the receiver coil based on respective misalignment correction values and measurements by said one of the magnetic field sensors; and comparing the mutual inductances with a predetermined inductance range to select said one transmitter coil from the subset of the transmitter coils.

The predetermined inductance range may be between 125 and 860 microhenries.

Determining a first power output of said one transmitter coil may comprise:

selecting the first power output from a first predetermined set of power outputs associated with the mutual inductance between said one transmitter coil and the receiver coil.

After energising said one transmitter coil to transmit at the first power output, the method may further comprise:

receiving power data from the electronic device;

calculating a second power output based on the power data, the first power output and the misalignment correction value between said one transmitter coil and the receiver coil; and energising said one transmitter coil to transmit at the second power output for the receiver coil.

The power data may include voltage of the battery of the electronic device.

In some embodiments, the predetermined maximum power output may be between 20 to 100 watts. In one embodiment, the predetermined maximum power output may be about 25 watts.

In accordance with another aspect of the present disclosure, there is provided a wireless charger for charging an electronic device having a receiver coil, the wireless charger comprising:

a housing having a charging surface and defining a predetermined charging region above the charging surface;

a set of transmitter coils;

a plurality of magnetic field sensors associated with a subset of the transmitter coils;

a memory or a storage device configured to store processor-executable instructions; and a processor operatively connected to the memory or the storage device, the transmitter coils and the magnetic field sensors, the processor configured to execute the stored processor-executable instructions, wherein execution of the stored processor-executable instructions causes the processor to:

measure magnetic fields in the predetermined charging region with the magnetic field sensors;

detect a change in the magnetic fields based on measurements by one of the magnetic field sensors indicative of the electronic device in the predetermined charging region;

select the subset of the transmitter coils associated with said one of the magnetic field sensors;

energise each transmitter coil in the subset of the transmitter coils to transmit a predetermined maximum power output for the receiver coil;

select one transmitter coil from the subset of the transmitter coils based on measurements by said one of the magnetic field sensors;

determine a first power output of said one transmitter coil based on measurements by said one of the magnetic field sensors; and energise said one transmitter coil to transmit at the first power output for the receiver coil.

Execution of the stored processor-executable instructions may cause the processor to select one transmitter coil from the subset of the transmitter coils by:

calculating mutual inductances between each transmitter coil in the subset of the transmitter coils and the receiver coil based on measurements by said one of the magnetic field sensors; and comparing the mutual inductances with a predetermined inductance range to select said one transmitter coil from the subset of the transmitter coils.

The predetermined inductance range may be between 125 and 860 microhenries.

Execution of the stored processor-executable instructions may cause the processor to determine a first power output of said one transmitter coil by:

selecting the first power output from a first predetermined set of power outputs associated with the mutual inductance between said one transmitter coil and the receiver coil.

Execution of the stored processor-executable instructions may cause the processor to select one transmitter coil from the subset of the transmitter coils by:

calculating misalignment correction values between each transmitter coil in the subset of the transmitter coils and the receiver coil based on measurements by said one of the magnetic field sensors;

calculating mutual inductances between each transmitter coil in the subset of the transmitter coils and the receiver coil based on respective misalignment correction values and measurements by said one of the magnetic field sensors; and comparing the mutual inductances with a predetermined inductance range to select said one transmitter coil from the subset of the transmitter coils.

The predetermined inductance range may be between 125 and 860 microhenries.

Execution of the stored processor-executable instructions may cause the processor to determine a first power output of said one transmitter coil by:

selecting the first power output from a first predetermined set of power outputs associated with the mutual inductance between said one transmitter coil and the receiver coil.

The wireless charger may further comprise a wireless communication module operatively connected to the processor. After execution of the stored processor-executable instructions that causes the processor to energise said one transmitter coil to transmit at the first power output, execution of the stored processor-executable instructions may further cause the processor to:

receive, by the wireless communication module, power data from the electronic device;

calculate a second power output based on the power data, the first power output and the misalignment correction value between said one transmitter coil and the receiver coil; and energise said one transmitter coil to transmit at the second power output for the receiver coil.

The power data may include voltage of the battery of the electronic device.

In some embodiments, the predetermined maximum power output may be between 20 to 100 watts. In one embodiment, the predetermined maximum power output may be about 25 watts.

Each of the magnetic field sensors may be a three-axis magnetometer.

In some embodiments, the wireless charger may further comprise a power supply. In one embodiment, the power supply may be a battery.

In accordance with a further aspect of the present disclosure, there is provided a method for charging an electronic device having a receiver coil by a wireless charger having a plurality of transmitter coils and a magnetic field sensor, the method comprising:

measuring, with the magnetic field sensor, magnetic fields in a predetermined charging region;

selecting one transmitter coil from the plurality of transmitter coils based on measurements by the magnetic field sensor;

determining a first power output of said one transmitter coil based on measurements by the magnetic field sensor; and energising said one transmitter coil to transmit at the first power output for the receiver coil.

The method may further comprise:

prior to selecting said one transmitter coil, energising each of the plurality of transmitter coils to transmit a predetermined maximum power output for the receiver coil in the predetermined charging region.

Selecting one transmitter coil may comprise:

calculating mutual inductances between each of the plurality of transmitter coils and the receiver coil based on measurements by the magnetic field sensor; and comparing the mutual inductances with a predetermined inductance range to select said one transmitter coil from the plurality of transmitter coils.

The predetermined inductance range may be between 125 and 860 microhenries.

Determining a first power output of said one transmitter coil may comprise:

selecting the first power output from a first predetermined set of power outputs associated with the mutual inductance between said one transmitter coil and the receiver coil.

Selecting one transmitter coil may comprise:

calculating misalignment correction values between each of the plurality of transmitter coils and the receiver coil based on measurements by the magnetic field sensor;

calculating mutual inductances between each of the plurality of transmitter coils and the receiver coil based on respective misalignment correction values and measurements by the magnetic field sensor; and comparing the mutual inductances with a predetermined inductance range to select said one transmitter coil from the plurality of transmitter coils.

The predetermined inductance range may be between 125 and 860 microhenries.

Determining a first power output of said one transmitter coil may comprise:

selecting the first power output from a first predetermined set of power outputs associated with the mutual inductance between said one transmitter coil and the receiver coil.

After energising said one transmitter coil to transmit at the first power output, the method may further comprise:

receiving power data from the electronic device;

determining a second power output based on the power data, the first power output and the misalignment correction value between said one transmitter coil and the receiver coil; and energising said one transmitter coil to transmit at the second power output for the receiver coil.

The power data may include voltage of the battery of the electronic device.

In accordance with yet another aspect of the present disclosure, there is provided a wireless charger for charging an electronic device having a receiver coil, the wireless charger comprising:

a housing having a charging surface and defining a predetermined charging region above the charging surface;

a plurality of transmitter coils;

a magnetic field sensor;

a memory or a storage device configured to store processor-executable instructions; and a processor operatively connected to the memory or the storage device, the transmitter coils and the magnetic field sensors, the processor configured to execute the stored processor-executable instructions, wherein execution of the stored processor-executable instructions causes the processor to:

measure magnetic fields in the predetermined charging region with the magnetic field sensor;

select one transmitter coil from the plurality of transmitter coils based on measurements by the magnetic field sensor;

determine a first power output of said one transmitter coil based on measurements by the magnetic field sensor; and energise said one transmitter coil to transmit at the first power output for the receiver coil.

Execution of the stored processor-executable instructions may further cause the processor to:

prior to selecting said one transmitter coil, energise each of the plurality of transmitter coils to transmit a predetermined maximum power output for the receiver coil in the predetermined charging region.

Execution of the stored processor-executable instructions may cause the processor to select one transmitter coil by:

calculating mutual inductances between each of the plurality of transmitter coils and the receiver coil based on measurements by the magnetic field sensor; and comparing the mutual inductances with a predetermined inductance range to select said one transmitter coil from the plurality of transmitter coils.

The predetermined inductance range may be between 125 and 860 microhenries.

Execution of the stored processor-executable instructions may cause the processor to determine a first power output of said one transmitter coil by:

selecting the first power output from a first predetermined set of power outputs associated with the mutual inductance between said one transmitter coil and the receiver coil.

Execution of the stored processor-executable instructions may cause the processor to select one transmitter coil from the subset of the transmitter coils by:

calculating misalignment correction values between each of the plurality of transmitter coils and the receiver coil based on measurements by the magnetic field sensor;

calculating mutual inductances between each of the plurality of transmitter coils and the receiver coil based on respective misalignment correction values and measurements by the magnetic field sensor; and comparing the mutual inductances with a predetermined inductance range to select said one transmitter coil from the plurality of transmitter coils.

The predetermined inductance range may be between 125 and 860 microhenries.

Execution of the stored processor-executable instructions may cause the processor to determine a first power output of said one transmitter coil by:

selecting the first power output from a first predetermined set of power outputs associated with the mutual inductance between said one transmitter coil and the receiver coil.

The wireless charger may further comprise a wireless communication module operatively connected to the processor. After execution of the stored processor-executable instructions that causes the processor to energise said one transmitter coil to transmit at the first power output, execution of the stored processor-executable instructions may further causes the processor to:

receive, by the wireless communication module, power data from the electronic device;

calculate a second power output based on the power data, the first power output and the misalignment correction value between said one transmitter coil and the receiver coil; and energise said one transmitter coil to transmit at the second power output for the receiver coil.

The power data may include voltage of the battery of the electronic device.

The magnetic field sensor may be a three-axis magnetometer.

In some embodiments, the wireless charger may further comprise a power supply. In one embodiment, the power supply may be a battery.

BRIEF DESCRIPTION OF DRAWINGS

Embodiments of the present disclosure will now be described hereinafter, by way of examples only, with reference to the accompanying drawings, in which.

DESCRIPTION OF EMBODIMENTS

FIGS. 1 to 4 show an embodiment of a wireless charger 10 for charging an electronic device 20. In this embodiment, the electronic device 20 has a single receiver coil 22, however, it will be appreciated that the electronic device 20 may include a plurality of receiver coils 22 in other embodiments. The electronic device 20 may include a mobile phone, headphones or earphones, a housing for wireless earbuds or earphones, a wearable health monitor device, a smart watch, a tablet device, a laptop computer, or any other devices of the type that are configured for wireless charging.

In this embodiment, the wireless charger 10 is designed to charge the electronic device 20 under the Qi Standard. It will be appreciated, however, that the wireless charger 10 may also be designed to charge the electronic device 20 under other wireless charging protocols.

Figure 1:
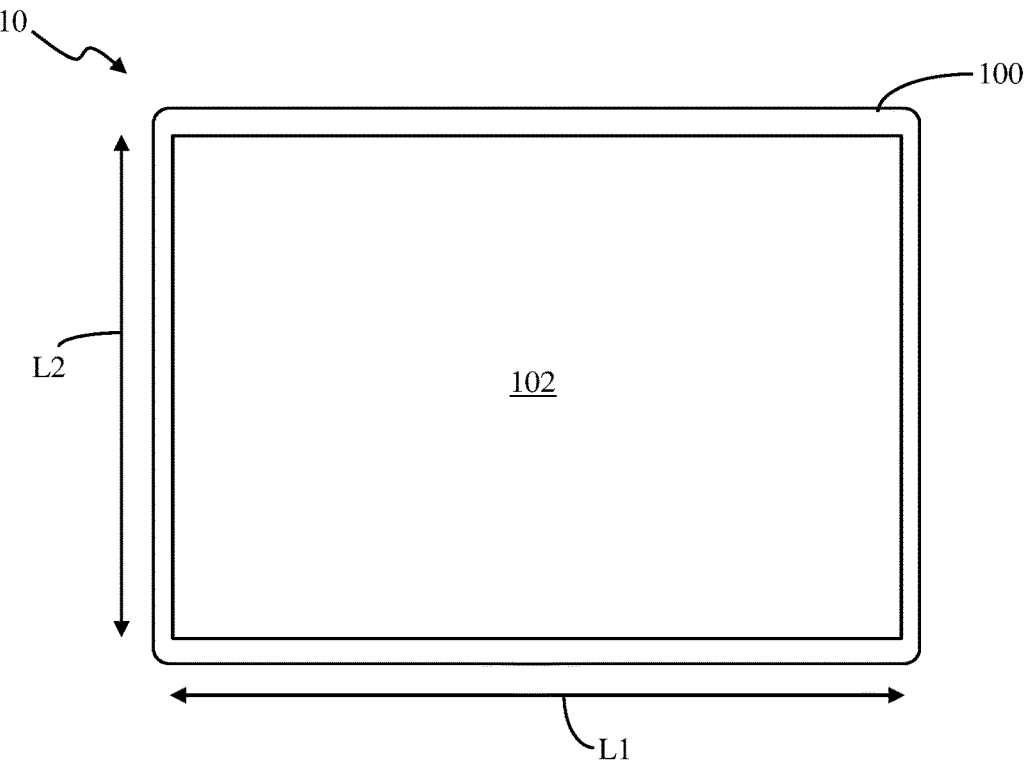
FIG. 1 is top view of an embodiment of a wireless charger.
Figure 2:
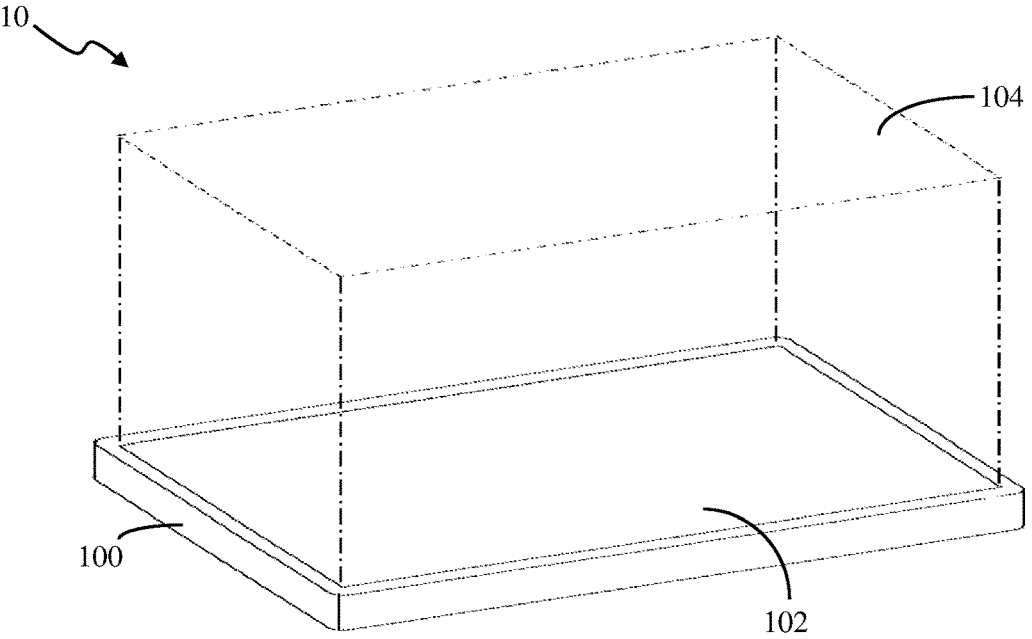
FIG. 2 is a perspective view of the wireless charger of FIG. 1.

With reference to FIG. 1, the wireless charger 10 has a housing 100 which houses electronic components of the wireless charger 10. The housing 100 includes an upwardly-facing planar charging surface 102 configured to receive one or more electronic devices 20 thereon. The charging surface 102 defines a boundary having a length L1 along the x-axis and a length L2 along the y-axis. The wireless charger 10 also defines a predetermined charging region 104 above the charging surface 102, as best shown in FIG. 2.

Figure 4:
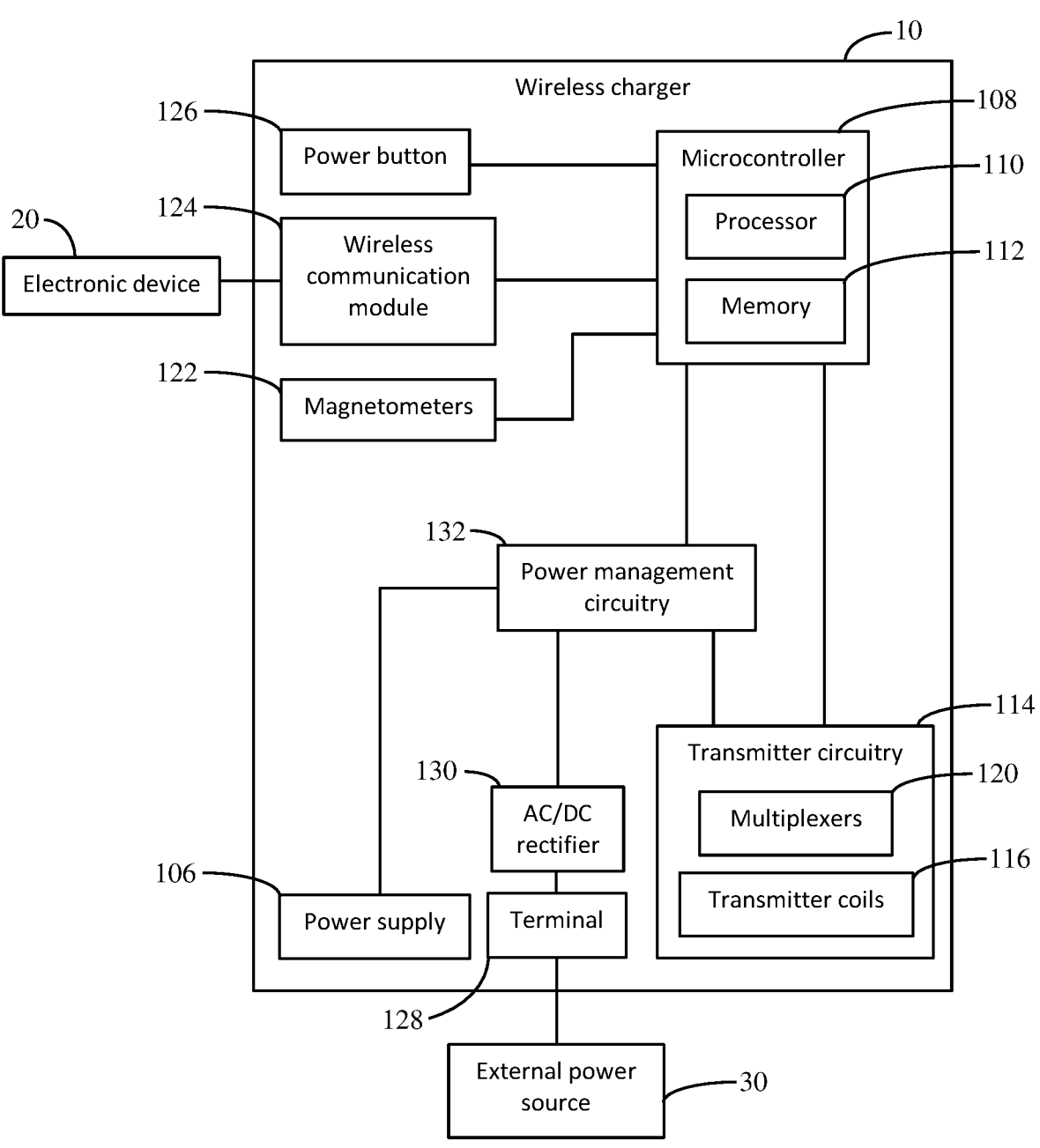
FIG. 4 is a schematic illustration of the wireless charger of FIG. 1 with an electronic device and an external power source.

Turning now to FIG. 4, the electronic components of the wireless charger 10 comprises a power supply 106 in the form of a direct current (DC) rechargeable battery for providing power to components of the wireless charger 10.

The electronic components of the wireless charger 10 also comprises a computing unit 108. The computing unit 108 is in the form of a microcontroller 108 having a processor 110 and a memory 112. The memory 112 is configured to store information and/or instructions for directing the processor 110, and may be read only memory (ROM), or a random access memory (RAM), or both, for example. The processor 110 is configured to execute instructions, such as those stored in the memory 112. In this embodiment, the microcontroller 108 is a Cortex-A34 microcontroller.

In other embodiments, the microcontroller 108 may have a storage device, such as a Hard Disk Drive (HDD).

Figure 5:
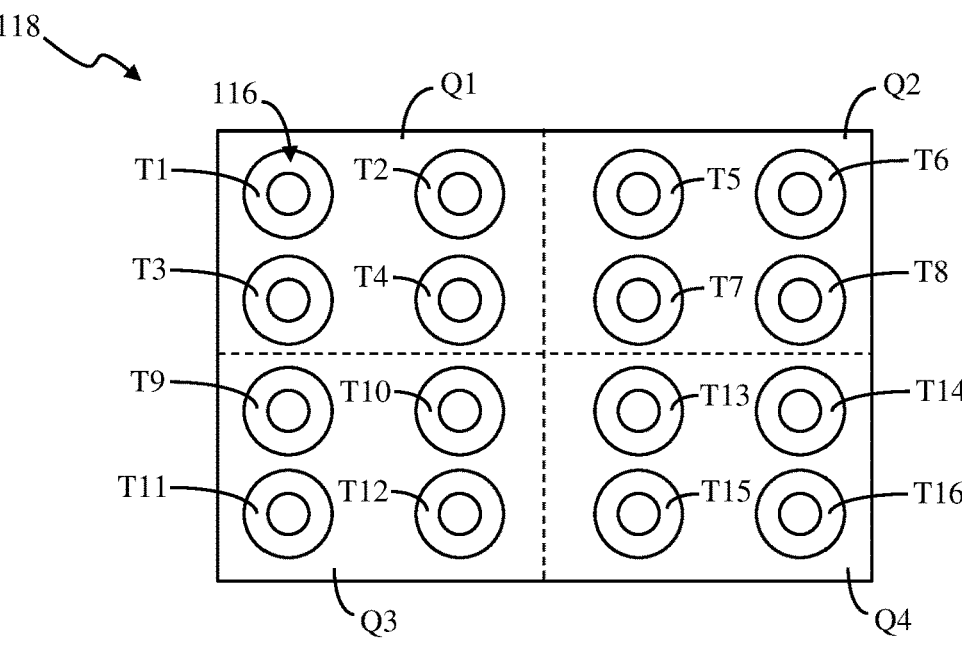
FIG. 5 is a top view of an embodiment of a coil array.

The electronic components of the wireless charger 10 further comprises transmitter circuitry 114 having a set of transmitter coils 116 arranged below the charging surface 102. Each of the transmitter coils 116 is configured to wirelessly transmit power to the receiver coil 22 of the electronic device 20. Specifically, each of the transmitter coils 116 is configured to induce a magnetic field along a z-axis that is substantially orthogonal to the charging surface 102. It will be appreciated that the induced magnetic field of each adjacent transmitter coil 116 will overlap. In this embodiment, the set of transmitter coils 116 has 16 circular transmitter coils 116 that are each spaced equidistantly from one another along a plane and arranged in a 4×4 coil array 118, as shown in FIG. 5. The transmitter coils 116 may be formed on a substrate such as a printed circuit board (PCB), for example.

Figure 7:
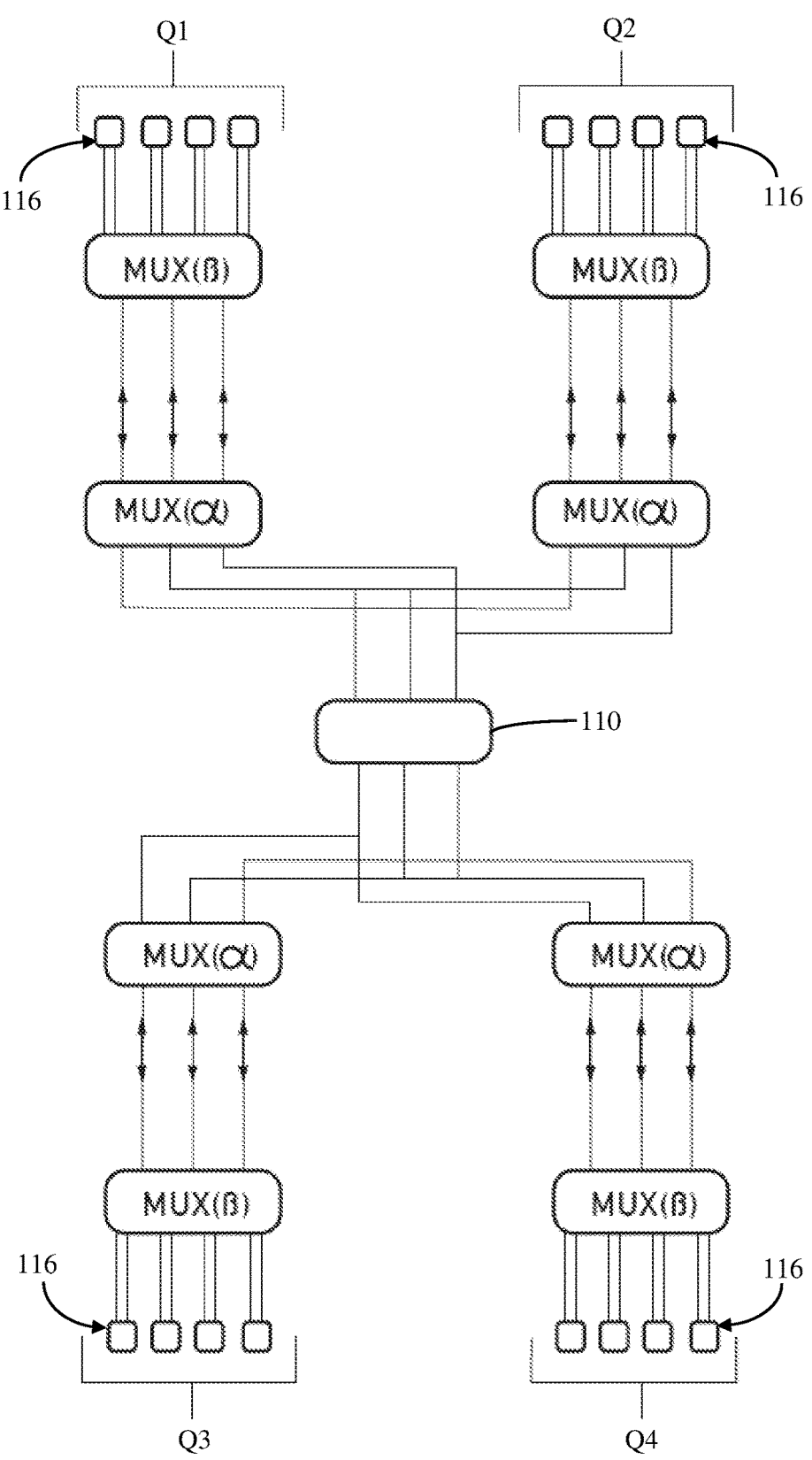
FIG. 7 is a schematic illustration of an embodiment of a 16:1 multiplexer tree.

The transmitter circuitry 114 also comprises a plurality of multiplexers 120 that operatively connect each of the transmitter coils 116 in the coil array 118 to the processor 110 and the power supply 106. Under the control of the processor 110, the multiplexers 120 are configured to direct the desired power output of the power supply 106 to one or more of the transmitter coils 116 at any given time. In this embodiment, the multiplexers 120 are arranged as a 16:1 multiplexer tree using a set of four 4:1 primary multiplexers MUX (β) in communication with a set of secondary multiplexers MUX (α), as shown in FIG. 7. The 4:1 primary multiplexers MUX (β) are each connected to a corresponding subset of four transmitter coils 116 so as to define four quadrants Q1, Q2, Q3, Q4 in the coil array 118, which for illustrative purposes are delineated by the dashed lines in FIG. 5. In this regard, the transmitter coils T1, T2, T3, T4 define the quadrant Q1, the transmitter coils T5, T6, T7, T8 define the quadrant Q2, the transmitter coils T9, T10, T11, T12 define the quadrant Q3, and the transmitter coils T13, T14, T15, T16 define the quadrant Q4.

Figure 8:
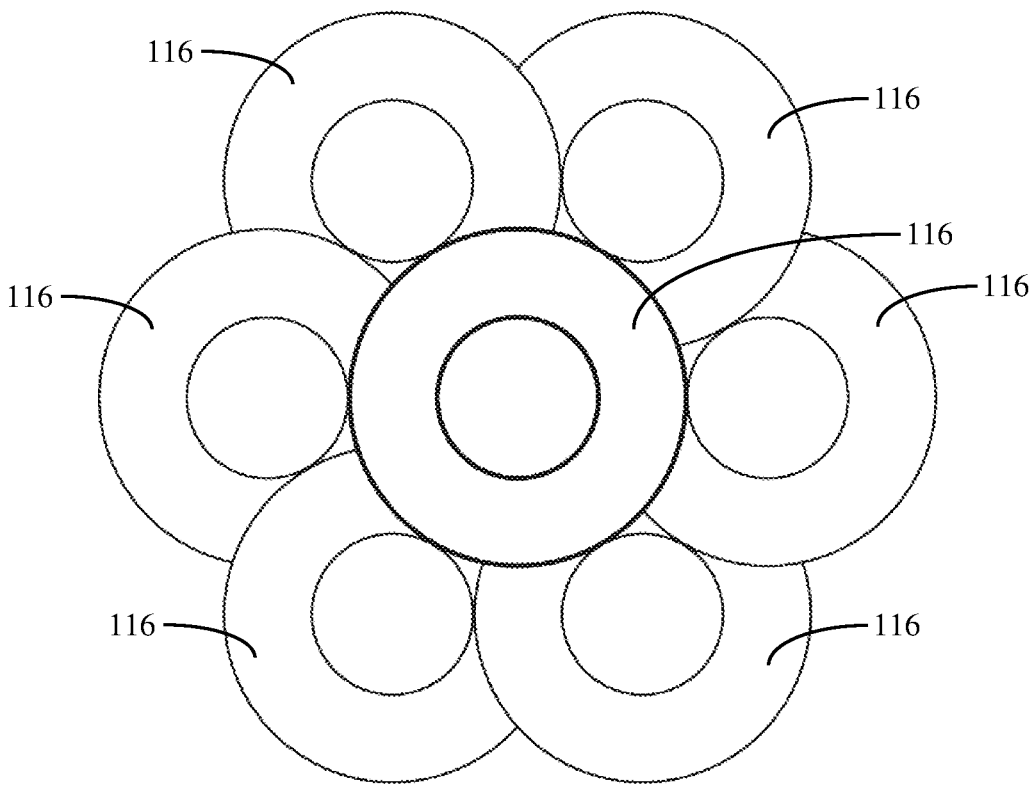
FIG. 8 is a top view of another embodiment of a coil array.
Figures 9, 10:
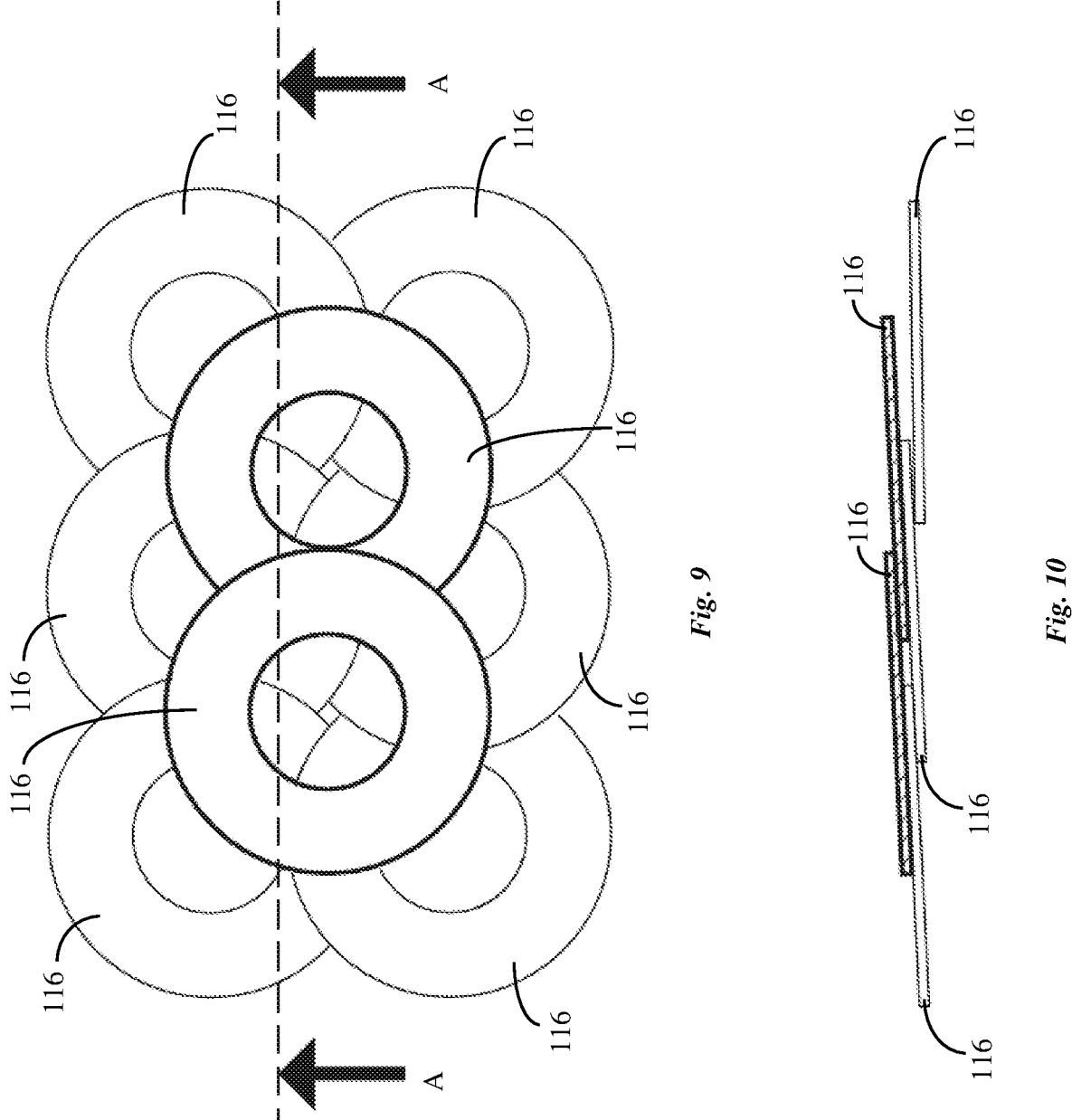
FIG. 9 is a top view of a further embodiment of a coil array.
FIG. 10 is a cross-sectional view of the coil array of FIG. 9 along A-A.

Although the embodiment shown in FIG. 5 includes 16 transmitter coils 116 of the same shape and size, it will be appreciated that any suitable design may be used for the transmitter coils 116. It will also be appreciated that each of the transmitter coils 116 may be formed in any suitable shape, size and material. Further, the coil array 118 may include any suitable number of transmitter coils 116, and the transmitter coils 116 may be arranged in any suitable manner. For example, the transmitter coils 116 may be arranged as a three-dimensional coil array in various shapes, wherein each of the transmitter coils 116 partially overlap an adjacent transmitter coil 116, as shown in FIGS. 8 to 10. It will also be appreciated that the transmitter circuitry 114 may also include any suitable number of multiplexers 120 arranged appropriately to correspond with the number of transmitter coils 116 in the wireless charger 10.

In some embodiments, the wireless charger 10 may also comprise a shielding (not shown) formed of ferrite or other material and disposed between the coil array 118 and the computing unit 108. As would be understood by persons skilled in the art, the shielding shields the computing unit 108 from magnetic fields emanating from the coil array 118 and serves to increase the magnetic field density above the coil array 118.

Figure 6:
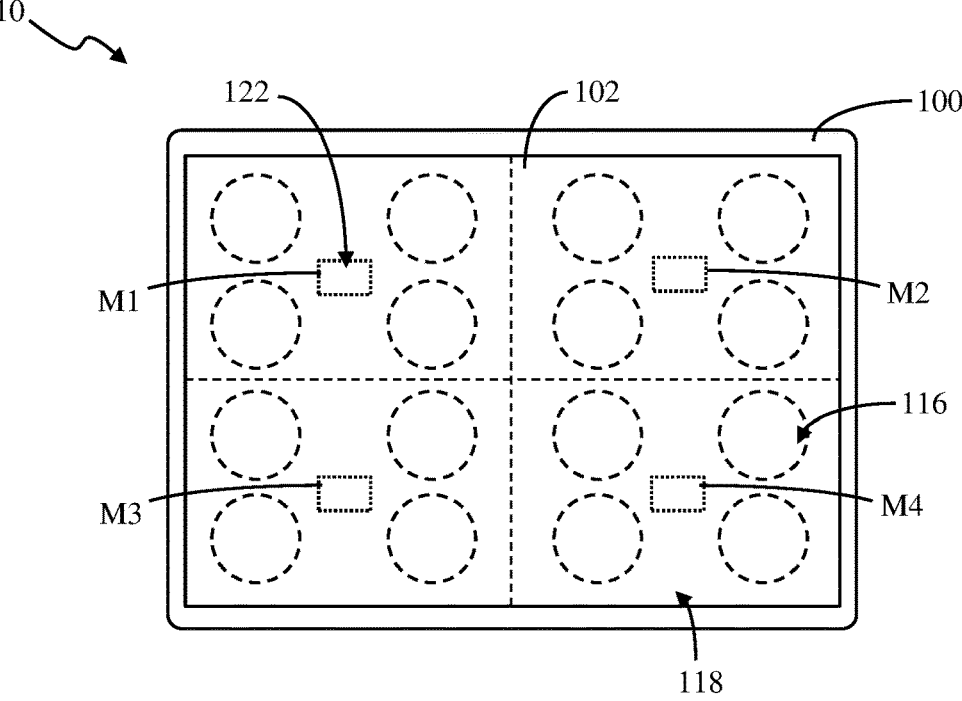
FIG. 6 is a top view of the wireless charger of FIG. 1 showing the coil array of FIG. 5 and multiplexers.

The electronic components of the wireless charger 10 also comprises a plurality of magnetic field sensors 122 arranged below the coil array 118. Each of the magnetic field sensors 122 is in the form of a three-axis magnetometer 122, such as a Honeywell HMR2300 magnetometer, for example, operatively connected to the processor 110. Each of the magnetometers 122 is spaced from one another along a plane and located at predetermined locations across the charging surface 102. In this embodiment, and as shown in FIG. 6, the wireless charger comprises four magnetometers 122 that are each located proximal to the transmitter coils 116 of a respective quadrant of transmitter coils 116 so as to be operatively 'associated' therewith. In this regard, the magnetometer M1 is associated with the transmitter coils T1, T2, T3, T4, the magnetometer M2 is associated with the transmitter coils T5, T6, T7, T8, the magnetometer M3 is associated with the transmitter coils T9, T10, T11, T12, and the magnetometer M4 is associated with the transmitter coils T13, T14, T15, T16. Each of the magnetometers 122 is configured to measure the strength and the direction of the magnetic fields emanating from the associated transmitter coils 116 within the vicinity of the magnetometer 122.

Moreover, the electronic components of the wireless charger 10 comprises a wireless communication module 124 in the form of a wireless transceiver 124 operatively connected to the processor 110 for data transmission therebetween. The wireless communication module 124 is configured to communicate with a chargeable electronic device 20 through any wireless technology such as, for example, Bluetooth, Near-Field Communication (NFC), or Radio-Frequency Identification (RFID). The wireless communication module 124 is configured to route incoming/outgoing data signals to and from the wireless charger 10 appropriately. For example, inbound data signals from the electronic device 20, such as power data of the electronic device 20, may be routed through the wireless communication module 124 before being directed to the processor 110, and outbound data signals from the processor 110 may be routed through the wireless communication module 124 before being transmitted externally to the electronic device 20.

Figure 3:
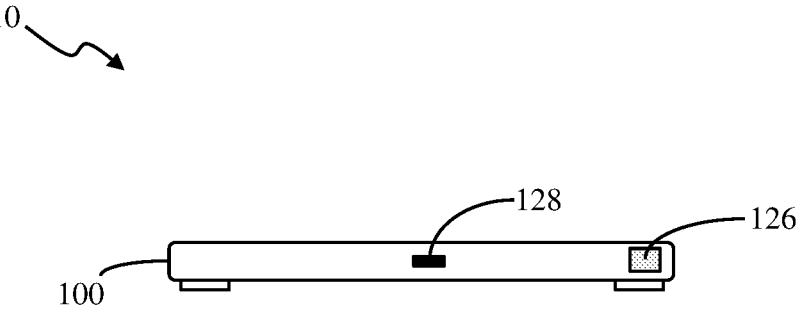
FIG. 3 is a front view of the wireless charger of FIG. 1.

With reference to FIG. 3, a power button 126 is located on the side of the housing 100 of the wireless charger 10, and is configured to make contact with a button actuator (not shown) located within the housing 100 when the power button 126 is pressed by a user. When the power button 126 is pressed, it triggers the processor 110 to carry out method operations described hereinafter.

The electronic components of the wireless charger 10 also includes a terminal 128 on the side of the housing 100, as shown in FIG. 3. The terminal 128 is configured to be connected to an external power source 30 such as, for example, an alternating current (AC) power supply, for providing power to the rechargeable battery 106 and/or other electronic components of the wireless charger 10. In this embodiment, the wireless charger 10 has an AC/DC rectifier 130 to convert the inbound external AC power to direct current (DC) power.

The electronic components of the wireless charger 10 also comprises power management circuitry 132 operatively connected to the processor 110, the power supply (battery) 106, the transmitter circuitry 114 and the terminal 128 via the AC/DC rectifier 130. Under the control of the processor 110, the power management circuitry 132 is configured to draw power from the battery 106 to power electronic components of the wireless charger 10 including, for example, the desired power to each of the transmitter coils 116 via the multiplexers 120. Under the control of the processor 110, and when the terminal 128 is connected to the external power source 30, the power management circuitry 132 is also configured to draw power from the external power source 30 and direct the power to the battery 106 for recharging of the battery 106. In some embodiments, the power management circuitry 132 is configured to draw power from the terminal 128 only to power electronic components of the wireless charger 10.

In some embodiments, the electronic components of the wireless charger 10 may be mounted on a single printed circuit board (PCB) or multiple interconnected PCBs.

Figure 11:
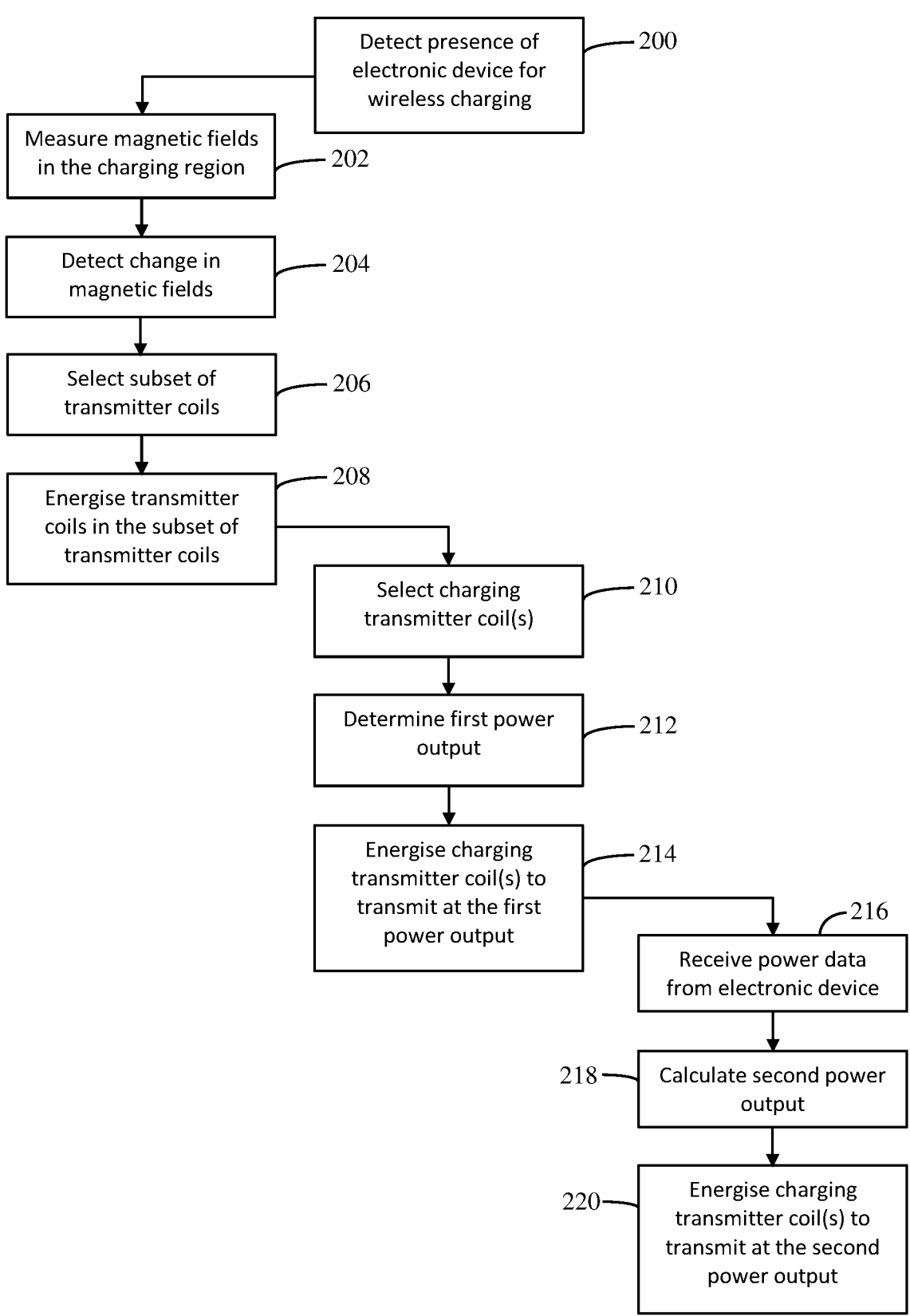
FIG. 11 is a flow diagram showing an embodiment of a method of charging an electronic device by the wireless charger of FIG. 1.

With reference to FIG. 11, the processor 110 of the wireless charger 10 is configured to execute instructions, such as those stored in the memory 112 to carry out the method operations described hereinafter. The method operations are commenced only after the wireless charger 10 is initialised by way of a user pressing down on the power button 126. For the sake of brevity, the electronic device 20 is considered to include a single receiver coil 22 therein.

The method begins, at step 200, by detecting the presence of an electronic device 20 in the charging region 104 for wireless charging. This detection is carried out using conventional "ping" techniques. For example, each of the transmitter coils 116 in the coil array 118 is in a 'scanning' state and periodically transmits a short pulse (referred to as a "ping" signal), generated through the resonant circuit of the transmitter coil 116, to establish communication with the electronic device 20. The ping signals are transmitted in accordance with the wireless charging standard of the transmitter coils (i.e., Qi Standard).

If an electronic device 20 is present, the receiver coil 22 of the electronic device 20 will respond to the received ping signal by transmitting a corresponding signal back to the transmitter coil(s) 116. If the corresponding signal transmitted by the receiver coil 22 is in accordance with the wireless charging standard of the transmitter coil(s) 116, the electronic device 20 is deemed to be compatible for charging. Communication between the receiver coil 22 and the transmitter coil(s) 116 is then established in a conventional manner through signal load modulation. Other wireless receivers and foreign objects placed in the charging region 104 would result in responses that are not in accordance with the wireless charging standard of the transmitter coils 116, and therefore deemed to be not compatible for charging. It will be appreciated that the detection of the electronic device 20 can be carried out using a digital ping, an analog ping, or both.

At step 202, when the electronic device 20 is in the charging region 104 above the charging surface 102, magnetic fields continually measured by each of the magnetometers 122 is received by the processor 110 and recorded and stored in the memory 112. The processor 110 filters the measurements to remove those outside the boundary of the charging surface 102.

It will be appreciated that the presence of the electronic device 20 in the charging region 104 causes a change in the magnetic field at the location of the electronic device 20. At step 204, the processor 110 detects the change in the magnetic field based on measurements by one of the magnetometers 122 in closest proximity to the electronic device 20 (referred hereinafter as the 'primary' magnetometer 122a). The processor 110, at step 206, then selects the subset of transmitter coils 116 that is associated with the primary magnetometer 122a.

In some instances, the processor 110 may detect the change in the magnetic field based on measurements across two or more of the magnetometers 122 due to overlapping magnetic fields of adjacent transmitter coils 116. In this regard, the processor 110 may make a determination on which magnetometer 122 measured the greatest change in magnetic field, and may select the transmitter coils 116 associated with the magnetometer 122 that measured the greatest change in magnetic field. The processor 110 may also select all transmitter coils 116 associated with the two or more magnetometers 122 depending on the change in the magnetic fields.

Subsequently, at step 208, the processor 110 energises each transmitter coil 116 in the subset of transmitter coils 116 to transmit a predetermined maximum power output for indiscriminate charging of the electronic device 20. The predetermined maximum power output may be between 20 to 100 watts, for example. In this embodiment, the predetermined maximum power output is about 25 watts. Energising each transmitter coil 116 in the subset of transmitter coils 116 allows the electronic device 20 to receive an initial charge even when the electronic device 20 has not yet contacted the charging surface 102 (i.e., when the electronic device 20 is located substantially above the charging surface 102). It will be appreciated that the amount of power received by the receiver coil 22 will depend on various factors such as, for example, the distance and orientation of the receiver coil 22 relative to the energised transmitter coils 116.

When the electronic device 20 is placed on or substantially near the charging surface 102, at step 210, the processor 110 then selects one of the transmitter coils 116 from the subset of transmitter coils 116 based on the measurements by the primary magnetometer 122. The selected transmitter coil 116 is referred to hereinafter as the 'charging' transmitter coil 116a. In other embodiments, two or more charging transmitter coils 116a may be selected. Selection of the charging transmitter coil 116a is made by first calculating the mutual inductance M between each transmitter coil 116 in the subset of transmitter coils 116 and the receiver coil 22, as described below.

The self-inductance $L_1$ of each transmitter coil 116 in the subset of transmitter coils 116 and the self-inductance $L_2$ of the receiver coil 22 may be given as:

$$L_1 = \frac{\mu_0 \mu_r N_1^2 A}{l} \tag{1}$$

$$L_2 = \frac{\mu_0 \mu_r N_2^2 A}{l} \tag{2}$$

where:
$\mu_0$ is the permeability of free space $(4\pi \times 10^{-7})$;
$\mu_0$ is the relative permeability of the core of the transmitter coil 116/receiver coil 22;
$N_1$ is the number of turns of the transmitter coil 116;
$N_2$ is the number of turns of the receiver coil 22;
A is the cross-sectional area of the transmitter coil 116/receiver coil 22; and
l is the length of the transmitter coil 116/receiver coil 22.

In this embodiment, the self-inductance $L_2$ of the receiver coil 22 is equated to the self-inductance $L_1$ of each transmitter coil 116 as it is assumed that the receiver coil 22 is identical or substantially similar to each transmitter coil 116. Accordingly, the mutual inductance M that exists between each of the transmitter coils 116 in the subset of transmitter coils 116 and the receiver coil 22 may be given as:

$$M = \frac{\mu_0 \mu_r N_1 N_2 A}{l} \tag{3}$$

The above formula for mutual inductance M assumes perfect electromagnetic coupling between each of the transmitter coils 116 in the subset of transmitter coils 116 and the receiver coil 22. However, it will be appreciated that there will be some degree of imperfect electromagnetic coupling between each of the transmitter coils 116 in the subset of transmitter coils 116 and the receiver coil 22. The amount of electromagnetic coupling, also referred to as the coupling coefficient k, can be expressed as a fractional number between 0 and 1, where 0 indicates no inductive coupling and 1 indicates full or maximum inductive coupling between each of the transmitter coils 116 in the subset of transmitter coils 116 and the receiver coil 22. In this embodiment, the processor 110 calculates the coupling coefficient k as follows:

$$k_1 = \frac{\varphi_m}{\varphi_1} \tag{4}$$

$$k_2 = \frac{\varphi_m}{\varphi_2} \tag{5}$$

$$k = \sqrt{k_1 k_2} \tag{6}$$

where:
$k_1$ is the coupling coefficient of the transmitter coil 116;
$k_2$ is the coupling coefficient of the receiver coil 22;
$\varphi_m$ is the overall magnetic flux;
$\varphi_1$ is the magnetic flux of the transmitter coil 116; and
$\varphi_2$ is the induced magnetic flux in the receiver coil 22.

Subsequently, the processor 110 calculates the mutual inductance M taking into account the coupling coefficient k, as follows:

$$M = k\sqrt{L_1 L_2}$$

After calculating the mutual inductance M between each of the transmitter coils 116 in the subset of transmitter coils 116 and the receiver coil 22, the processor 110 compares the mutual inductances M with a predetermined inductance range. The predetermined inductance range is indicative of whether the transmitter coil 116 is able to provide power to the receiver coil 22. In this embodiment, the predetermined inductance range is between 125 and 860 microhenries. If the mutual inductances M are outside the predetermined inductance range, the transmitter coil(s) 116 is deemed to be unable to provide power to the receiver coil 22 and the processor 110 returns the transmitter coil(s) 116 to the scanning state. However, if the mutual inductances M are within the predetermined inductance range, the transmitter coil(s) 116 is deemed to be able to provide power to the receiver coil 22 and the processor 110 selects the transmitter coil(s) 116 as the charging transmitter coil(s) 116a and adjusts the power output of the charging transmitter coil(s) 116a from the predetermined maximum power output to a first power output $P_1$ for charging the receiver coil 22 in the next step, as described below.

Figure 12:
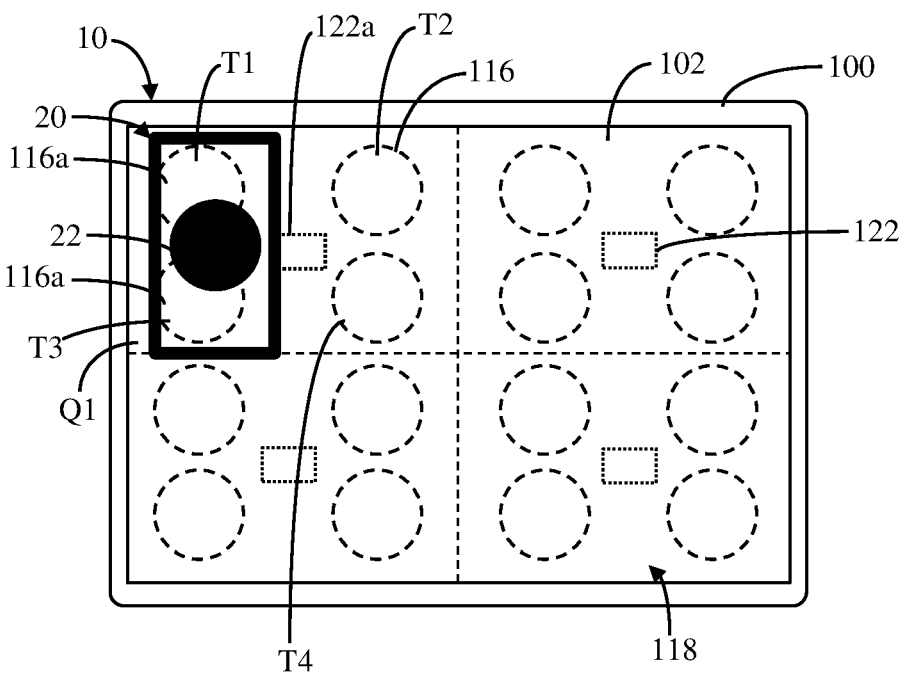
FIG. 12 is a top view of the wireless charger of FIG. 1 with an electronic device placed thereon.

FIG. 12 shows an example of the electronic device 20 being placed on the charging surface 102 in the quadrant Q1. Here, the transmitter coils T1, T3 are selected as the charging transmitter coils 116a and the transmitter coils T2, T4 are in the scanning state.

At step 212, the processor 110 determines the first power output $P_1$ for transmission by the charging transmitter coil(s) 116a based on measurements by the primary magnetometer 122a. In this regard, the processor 110 selects the first power output $P_1$ from a first predetermined set of power outputs associated with the mutual inductance M between the charging transmitter coil(s) 116a and the receiver coil 22. Subsequently, at step 214, the processor 110 energises the charging transmitter coil(s) 116a to transmit at the first power output $P_1$, thereby charging the electronic device 20.

Table 1 below shows an example of the first predetermined set of power outputs associated with the mutual inductance M between the charging transmitter coil(s) 116a and the receiver coil 22 for an instance where the self-inductance $L_1$ of the charging transmitter coil 116a is 0.000860 henry. If a mutual inductance M between the charging transmitter coil(s) 116a and the receiver coil 22 of 0.00052 henry is calculated, the processor 110 selects the first power output $P_1$ of 15 watts and energises the charging transmitter coil 116a to transmit at 15 watts.

TABLE 1

Example of the first predetermined set of power outputs

| Power Output, $P_1$ (watts) | Mutual Inductance, M (henry) | Inductance of Transmitter Coil, $L_1$ (henry) | Inductance of Receiver Coil, $L_2$ (henry) | Coupling Factor, K |
|---|---|---|---|---|
| 5.0 | 0.00086 | 0.000860 | 0.000860 | 1.00 |
| 7.5 | 0.00078 | 0.000860 | 0.000860 | 0.90 |
| 10.0 | 0.00065 | 0.000860 | 0.000860 | 0.75 |
| 12.0 | 0.00060 | 0.000860 | 0.000860 | 0.70 |
| 15.0 | 0.00052 | 0.000860 | 0.000860 | 0.60 |
| 17.0 | 0.00043 | 0.000860 | 0.000860 | 0.50 |
| 20.0 | 0.00034 | 0.000860 | 0.000860 | 0.40 |
| 22.5 | 0.00030 | 0.000860 | 0.000860 | 0.35 |
| 25.0 | 0.00022 | 0.000860 | 0.000860 | 0.25 |

As mentioned above, it will be appreciated that there may be some degree of imperfect electromagnetic coupling between each of the transmitter coils 116 in the subset of transmitter coils 116 and the receiver coil 22 when the electronic device 20 is on the charging surface 102. The degree of imperfect electromagnetic coupling may, for example, be due to horizontal misalignment between the receiver coil 22 and each of the transmitter coils 116 in the subset of transmitter coils 116. Accordingly, in another embodiment, at step 210, the processor 110 may calculate the mutual inductance M between each of the transmitter coils 116 in the subset of transmitter coils 116 and the receiver coil 22 by first calculating a misalignment correction value v between each of the transmitter coils 116 in the subset of transmitter coils 116 as follows:

$$v = \sqrt{1 + \frac{d^2}{r_s^2} - 2\frac{d}{r_s}\cos\varphi_m} \tag{8}$$

where:
  d is the distance between the centre axes of the transmitter coil 116 and the receiver coil 22; and
  $r_s$ is the radius of the receiver coil 22.

The processor 110 then calculates the mutual inductance M based on the misalignment correction value v, as follows:

$$M = \frac{\mu_0}{\pi}\sqrt{r_p r_s}\int_0^\pi \frac{\left(1 - \frac{d}{r_s}\cos\varphi_m\right)\Psi(m)}{\sqrt{v^3}}d\varphi_m \tag{9}$$

where:
  $r_p$ is the radius of the transmitter coil 116;

$\Psi(m)$ is given by $\Psi(m) = \left(\frac{2}{m} - m\right)K(m) - \frac{2}{m}E(m)$;

$K(m)$ is given by $K(m) = \int_0^\pi \sqrt{\frac{1}{1 - m^2\sin^2\theta}}d\theta$;

$E(m)$ is given by $E(m) = \int_0^\pi \sqrt{1 - m^2\sin^2\theta}d\theta$;

$m$ is given by $m = \sqrt{\frac{4\alpha v}{(1 + \alpha v) + \beta^2}}$;

$\ominus$ is the angle of the receiver coil 22 relative to the transmitter coil 116;

$\alpha$ is given by $\alpha = \frac{r_s}{r_p}$;

$\beta$ is given by $\beta = \frac{c}{r_p}$; and c is the vertical distance between the transmitter coil 116 and the receiver coil 22.

If there is no horizontal misalignment between the receiver coil 22 and the transmitter coil(s) 116, then m may be given by $$m^2 = \sqrt{\frac{4r_p r_s}{(r_p + r_s)^2 + c^2}}.$$

After calculating the mutual inductance M between each of the transmitter coils 116 in the subset of transmitter coils 116 and the receiver coil 22, the processor 110 compares the mutual inductances M with the predetermined inductance range, which in this embodiment is between 125 and 860 microhenries. If the mutual inductances M are outside the predetermined inductance range, the transmitter coil(s) 116 is deemed to be unable to provide power to the receiver coil 22 and the processor 110 returns the transmitter coil(s) 116 to the scanning state. However, if the mutual inductances M are within the predetermined inductance range, the transmitter coil(s) 116 is deemed to be able to provide power to the receiver coil 22 and the processor 110 selects the transmitter coil(s) 116 as the charging transmitter coil(s)

116a and adjusts the power output of the charging transmitter coil(s) 116a from the predetermined maximum power output to a first power output $P_1$ for charging the receiver coil 22 in the next step, as described below.

The processor 110, at step 212, selects the first power output $P_1$ from the first predetermined set of power outputs associated with the mutual inductance M between the charging transmitter coil(s) 116a and the receiver coil 22. Subsequently, at step 214, the processor 110 energises the charging transmitter coil(s) 116a to transmit at the first power output $P_1$, thereby charging the electronic device 20.

As power is transmitted from the wireless charger 10 to the electronic device 20, the battery level of the electronic device 20 will increase over time. Accordingly, it may be inefficient for the charging transmitter coil(s) 116a to constantly transmit at the first power output $P_1$. To improve efficiencies, the processor 110 dynamically adjusts the power output transmitted by the charging transmitter coil(s) 116a over time based on the battery level of the electronic device 20, as described below.

After energising the charging transmitter coil(s) 116a at first power output $P_1$, the processor receives power data from the electronic device 20 via the wireless communication module 124, at step 216. In this embodiment, the power data includes the voltage of the battery of the electronic device 20 at any given time. The processor 110 then calculates, at step 218, a second power output $P_2$ for transmission by the charging transmitter coil(s) 116a based on the power data, the first power output $P_1$ and the misalignment correction value v between the charging transmitter coil(s) 116a and the receiver coil 22, as follows:

$$P_2 = P_1\left(\frac{P_{max}}{M\Psi(m)}\right)k \qquad (10)$$

where:

$P_{max}$ is given by $P_{max} = \dfrac{\omega^2 M^2 V^2 R_{L-P_{max}}}{\left(\omega^2 M^2 + R_p\left(R_s + R_{L-P_{max}}\right)\right)^2}$;

ω is the angular frequency of the charging transmitter coil 116a;

V is the voltage of the battery of the electronic device 20;

$R_{L-P_{max}}$ is given by $R_{L-P_{max}} = R_s\left(1 + \dfrac{\omega^2 M^2}{R_p R_s}\right)$;

$R_p$ is the internal resistance of the charging transmitter coil 116a; and $R_s$ is the internal resistance of the receiver coil 22.

At step 220, the processor then energises the charging transmitter coil(s) 116a to transmit at the second power output $P_2$, thereby charging the electronic device 20.

It will be appreciated that the above method operations of dynamically adjusting the power output of the charging transmitter coil(s) 116a based on the battery level of the electronic device 20 may be continuously performed over subsequent time periods. In this regard, the first power output $P_1$ would correspond with the power output immediately preceding the second power output $P_2$ of the charging transmitter coil(s) 116a.

It will also be appreciated that the above method operations may be carried out in respect of an electronic device 20 having two or more receiver coils 22 therein, which may be the case in larger wireless chargeable electronic devices.

Figure 14:
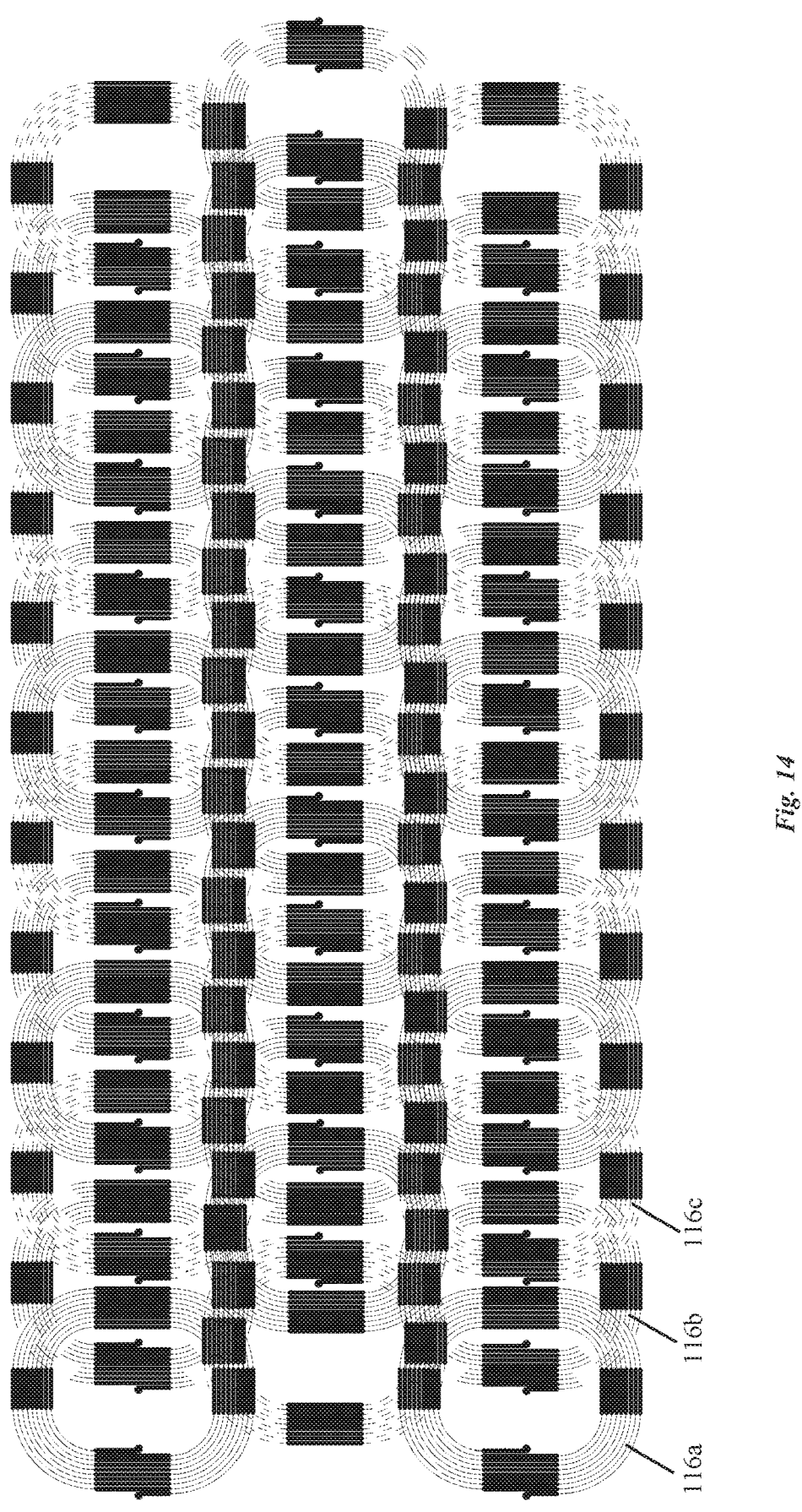
FIG. 14 is a top view of yet another embodiment of a coil array.

In some embodiments, the coil array 118 may be formed on a multi-layered PCB. FIG. 14 shows one such coil array 118 in which 36 transmitter coils 116 are etched onto a three-layer PCB. Each layer of the PCB includes 12 transmitter coils 116 that are arranged in a checkered pattern. In the embodiment shown in FIG. 14, the top layer of the PCB comprises a first set of 12 transmitter coils 116a, the middle layer of the PCB comprises a second set of 12 transmitter coils 116b and the bottom layer of the PCB comprises a third set of 12 transmitter coils 116c. The transmitter coils 116a, 116b, 116c are laterally offset from one another as shown in FIG. 14, so as to provide complete coverage of the charging surface 102. Such a multi-layered coil array 118 substantially reduces dead zones across the charging surface 102 and allows for filtering of individual transmitter coils 116 when they are powered and in use simultaneously, thus reducing interference that is caused by signal noise generated in high powered wireless charging which transmits power to multiple devices simultaneously. The etching of the transmitter coils 116a, 116b, 116c onto the PCB also provides for a more compact and cheaper system compared to transmitter coils constructed using traditional methods, such as Litz wire construction, for example. Furthermore, the multi-layered coil array 118 allows for the heat generated in the wireless charger 10 to be dissipated across the layers of the PCB. For example, it will be appreciated that not all layers of the transmitter coils 116 may need to be utilised at all times, meaning that a layer of transmitter coils 116 that generates more heat can dissipate its heat across the other unused layers, thus increasing the overall efficiency of the wireless charger 10.

In other embodiments, the wireless charger 10 may comprise only one magnetometer 122. It will be appreciated that the processor 110 of the wireless charger 10 may be configured to execute instructions to carry out the above method operations in a similar manner, except that the magnetometer 122 is taken to be the primary magnetometer 122a and the step of selecting the subset of transmitter coils 116 is not carried out as the subset of transmitter coils 116 is taken to be the transmitter coils 116 as a whole.

The embodiments described above has numerous advantages. For example, the wireless charger 10 is portable and allows electronic devices to be wirelessly charged efficiently and effectively. The wireless charger 10 also provides a continuous charging area that allows free-positioning of the electronic device 20 on the charging surface 102, whilst taking into account the degree of imperfect electromagnetic coupling between the charging transmitter coil(s) 116a and the receiver coil 22. Further, the wireless charger 10 allows selective charging transmitter coil(s) 116a to be energised, whilst leaving the uncoupled or unused transmitter coil(s) 116 in the scanning state. This reduces heat generation in the coil array 118 and interference in the overlapping magnetic fields of the uncoupled or unused transmitter coil(s) 116, thus providing for more consistent charging.

Further, the wireless charger 10 also provides initial indiscriminate charging of the electronic device 20 in the charging region 104 above the charging surface 102 via the energisation of individual quadrants of the coil array 118, which negates any delays in charging the electronic device 20 caused by the multiplexer arrangement.

Figure 13:
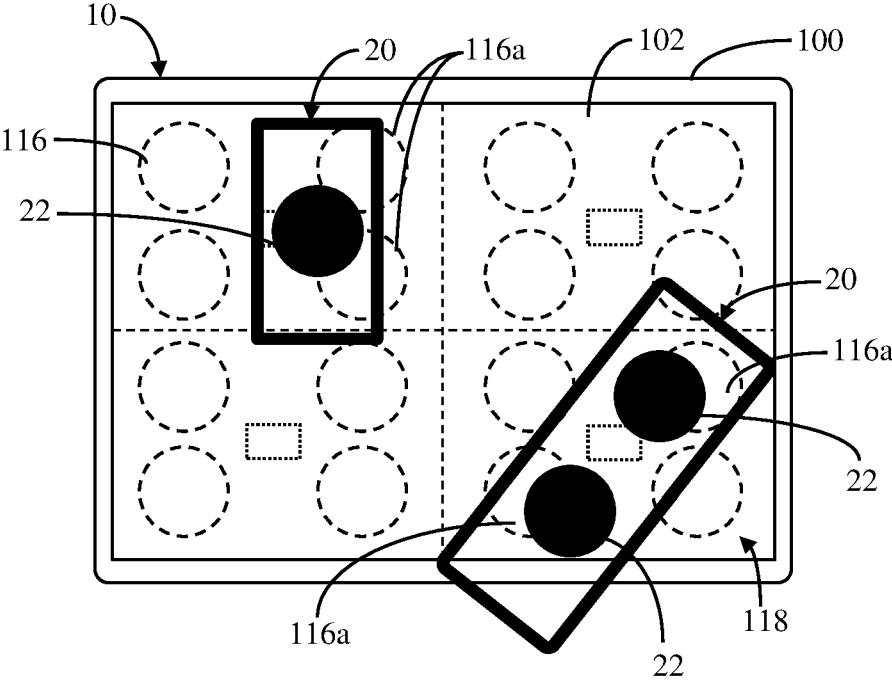
FIG. 13 is a top view of the wireless charger of FIG. 1 with two electronic devices placed thereon.

The wireless charger 10 is also capable of charging multiple electronic devices 20 simultaneously. An example of such an arrangement is shown in FIG. 13. Here, two electronic devices 20 are placed on the charging surface 102 above two quadrants of the coil array 118. The charging transmitter coil(s) 116a of each quadrant are selected to charge each electronic device 20 simultaneously, whilst leaving the uncoupled or unused transmitter coils 116 in the scanning state.

Moreover, the processor 110 is capable of dynamically adjusting the power output of the charging transmitter coil(s) 116a based on the battery level of the electronic device 20 to ensure that power is being transmitted efficiently. The wireless charger 10 may also be scaled to include any suitable number of transmitter coils 116, multiplexers 120 and magnetometers 122 corresponding to the size of the housing 100 and therefore potentially charge any suitable number of electronic devices.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for charging an electronic device having a receiver coil by a wireless charger having a set of transmitter coils and a plurality of magnetic field sensors, each of the magnetic field sensors associated with a subset of the transmitter coils, the method comprising:

measuring, with the magnetic field sensors, magnetic fields in a predetermined charging region;

detecting a change in the magnetic fields based on measurements by one of the magnetic field sensors indicative of the electronic device in the predetermined charging region;

selecting the subset of the transmitter coils associated with said one of the magnetic field sensors;

energising each transmitter coil in the subset of the transmitter coils to transmit a predetermined maximum power output for the receiver coil;

calculating misalignment correction values between each transmitter coil in the subset of the transmitter coils and the receiver coil based on measurements by said one of the magnetic field sensors;

calculating mutual inductances between each transmitter coil in the subset of the transmitter coils and the receiver coil based on respective misalignment correction values and measurements by said one of the magnetic field sensors;

comparing the mutual inductances with a predetermined inductance range to select one transmitter coil from the subset of the transmitter coils;

determining a first power output of said one transmitter coil based on the mutual inductance between said one transmitter coil and the receiver coil; and energising said one transmitter coil to transmit at the first power output for the receiver coil.

2. The method of claim 1, wherein the predetermined inductance range is between 125 and 860 microhenries.

3. The method of claim 1, wherein determining a first power output of said one transmitter coil comprises:

selecting the first power output from a first predetermined set of power outputs associated with the mutual inductance between said one transmitter coil and the receiver coil.

4. The method of claim 1, after energising said one transmitter coil to transmit at the first power output, further comprising:

receiving power data from the electronic device;

calculating a second power output based on the power data, the first power output and the misalignment correction value between said one transmitter coil and the receiver coil; and energising said one transmitter coil to transmit at the second power output for the receiver coil.

5. The method of claim 4, wherein the power data includes voltage of a battery of the electronic device.

6. The method of claim 1, wherein the predetermined maximum power output is between 20 to 100 watts.

7. The method of claim 6, wherein the predetermined maximum power output is about 25 watts.

8. A wireless charger for charging an electronic device having a receiver coil, the wireless charger comprising:

a housing having a charging surface and defining a predetermined charging region above the charging surface;

a set of transmitter coils;

a plurality of magnetic field sensors associated with a subset of the transmitter coils;

a memory or a storage device configured to store processor-executable instructions; and a processor operatively connected to the memory or the storage device, the transmitter coils and the magnetic field sensors, the processor configured to execute the stored processor-executable instructions, wherein execution of the stored processor-executable instructions causes the processor to:

measure magnetic fields in the predetermined charging region with the magnetic field sensors;

detect a change in the magnetic fields based on measurements by one of the magnetic field sensors indicative of the electronic device in the predetermined charging region;

select the subset of the transmitter coils associated with said one of the magnetic field sensors;

energise each transmitter coil in the subset of the transmitter coils to transmit a predetermined maximum power output for the receiver coil;

calculate misalignment correction values between each transmitter coil in the subset of the transmitter coils and the receiver coil based on measurements by said one of the magnetic field sensors;

calculate mutual inductances between each transmitter coil in the subset of the transmitter coils and the receiver coil based on respective misalignment correction values and measurements by said one of the magnetic field sensors;

compare the mutual inductances with a predetermined inductance range to select said one transmitter coil from the subset of the transmitter coils;

determine a first power output of said one transmitter coil based on the mutual inductance between said one transmitter coil and the receiver coil; and energise said one transmitter coil to transmit at the first power output for the receiver coil.

9. The wireless charger of claim 8, wherein the predetermined inductance range is between 125 and 860 microhenries.

10. The wireless charger of claim 8, wherein execution of the stored processor-executable instructions causes the processor to determine a first power output of said one transmitter coil by:

selecting the first power output from a first predetermined set of power outputs associated with the mutual inductance between said one transmitter coil and the receiver coil.

11. The wireless charger of claim 8, further comprising a wireless communication module operatively connected to the processor, and after execution of the stored processor-executable instructions that causes the processor to energise said one transmitter coil to transmit at the first power output, execution of the stored processor-executable instructions further causes the processor to:

receive, by the wireless communication module, power data from the electronic device;

calculate a second power output based on the power data, the first power output and the misalignment correction value between said one transmitter coil and the receiver coil; and energise said one transmitter coil to transmit at the second power output for the receiver coil.

12. The wireless charger of claim 11, wherein the power data includes voltage of a battery of the electronic device.

13. The wireless charger of claim 8, wherein the predetermined maximum power output is between 20 to 100 watts.

14. The wireless charger of claim 13, wherein the predetermined maximum power output is about 25 watts.

15. The wireless charger of claim 8, wherein each of the magnetic field sensors is a three-axis magnetometer.

16. The wireless charger of claim 8, further comprising a power supply.

17. The wireless charger of claim 16, wherein the power supply is a battery.

* * * * *